Oct. 27, 1936.　　　H. R. SEWELL　　　2,058,919
AIR CONDITIONING APPARATUS
Filed Jan. 17, 1933
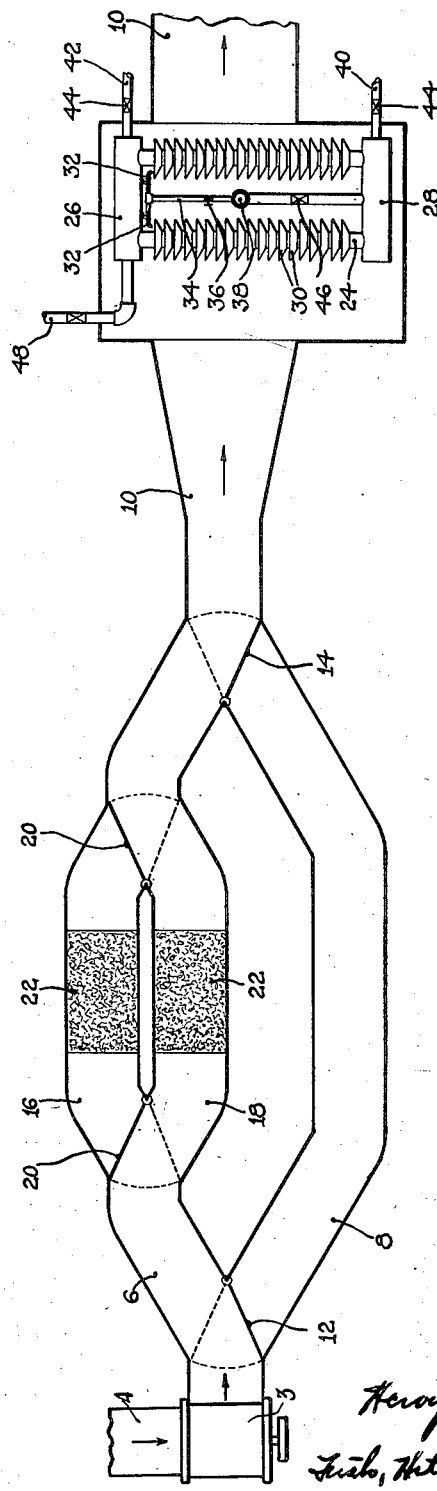

Patented Oct. 27, 1936

2,058,919

UNITED STATES PATENT OFFICE 2,058,919

AIR CONDITIONING APPARATUS

Henry R. Sewell, Jamaica Plain, Mass., assignor to B. F. Sturtevant Company, Hyde Park, Mass., a corporation of Massachusetts Application January 17, 1933, Serial No. 652,166

4 Claims. (Cl. 257—9)

The present invention relates to air conditioning apparatus.

The object of the present invention is to provide apparatus suitable for conditioning air supplied to auditoriums, school rooms, and the like, and sufficiently simple and inexpensive for use in residences, and capable of controlling the temperature and moisture content of the air both in summer and winter.

With this object in view, the principal feature of the invention comprises a body of adsorbent material, means for selectively passing the air through the adsorbent material for dehumidifying or by-passing it around the adsorbent material when no dehumidification is necessary, together with heat exchange apparatus having provision for either heating or cooling of the fluid and provided with extended surface over which water may be flowed for humidification of dry air.

Other features of the invention consist of certain novel features of construction, combinations and arrangements of parts hereinafter described and particularly defined in the claims.

The accompanying drawing is a diagram of the peferred form of the present invention.

The invention is herein illustrated and described as embodied in a system of conditioning air for small residences. The system provides for dehumidifying and cooling the air in summer and for heating and humidifying the air in winter.

The apparatus comprises a centrifugal fan 3 located in the return duct 4 which leads from the enclosure and which connects into two main ducts 6 and 8, the former being termed a summer duct and the latter a winter duct. The main ducts 6 and 8 connect into a supply duct 10. The flow of air through ducts 6 and 8 is selectively controlled by dampers 12 and 14 which may be operated manually.

The summer duct 6 is divided into two branches 16 and 18, the flow of air therethrough being selectively controlled by dampers 20. Each of the branch ducts is adapted to contain a body of adsorbent material, indicated at 22. This material preferably comprises silica gel, activated carbon, or any other material capable of absorbing moisture from the air. The air is passed through only one of the ducts 16 or 18 at a time in order to permit the spent adsorbent material to be removed from the other duct or re-activated in any suitable manner, as by heating.

The supply duct 10 is provided with heat exchange apparatus preferably consisting of the apparatus described in the application of Goldthwaite, Serial No. 559,171, filed August 25, 1931, now Patent No. 1,975,267 issued Oct. 2, 1934. The apparatus comprises a plurality of vertical tubes 24 connected into the top and bottom headers 26 and 28. The tubes are provided with cup-shaped fins 30 which act as extended surface for enhancing the transfer of heat and which are also adapted to contain water for purposes of humidification. As explained in such prior application, water may be continuously introduced into the uppermost cups of the several rows from petcocks 32 which are connected to a supply line 34. The water flows in continuous streams downwardly over the cups, thereby presenting a considerable body of water to the current of air in the duct. The pipe 34 has a valve 36 and is connected into the main water supply line 38.

Provision is made for circulating either a heating or cooling fluid through the tubes. To this end, steam pipes 40 and 42 are connected into the top and bottom headers, these pipes being provided with valves 44. The water pipe 38 is connected to the lowermost header 28 through a valve 46 and a return water pipe 48 is connected into the top header.

For summer air conditioning, when the temperature and humidity of the air are higher than desirable for comfort, the air is passed through the summer duct 6 (the dampers 12 and 14 being in the position shown), and through either one of the branch ducts 16 and 18 to contact with the body of activated adsorbent material. The air thus dehumidified is passed over the tubes of the heat exchange apparatus through which cooled water is circulated from the supply line 38, the steam supply being shut off and the valve 36 closed to prevent any passage of water externally of the tubes.

For winter conditioning, the winter duct 8 is opened, and the summer duct 6 is closed. The air then passes over the heat exchange apparatus through which steam is passed from the steam line 40. Since the humidity of fresh air is generally low in winter, the moisture content is increased by introducing water into the rows of cups 30 from the supply line 38.

The apparatus is sufficiently simple and inexpensive to warrant its use in residences. For summer air conditioning, the adsorbent material removes a sufficient quantity of moisture to increase the comfort very considerably. The temperature is also reduced by the heat exchange apparatus through which it is only necessary to circulate water from the domestic supply without refrigeration, unless a very considerable reduction of temperature is desired, in which case the circulating water may be artificially cooled in any convenient and well-known manner. The only care necessary is an occasional re-activation of the adsorbent, and it is for this purpose that the two branches 16 and 18 are provided, permitting replacement or re-activation of the spent adsorbent in one of the branch ducts, while continuing the dehumdifying operation in the other.

In winter, the air is circulated through the by-pass duct 8 out of contact with the adsorbent and is heated and humidified as described in the pending application above referred to. The change from summer to winter conditioning is readily accomplished merely by throwing the main dampers 12 and 14, and by operating the valves to change the water supply from the interior to the exterior of the tubes and to admit steam internally of the tubes.

While the present invention has been shown and described as operating in a system in which all the air is recirculated, it is to be understood that this is the preferable arrangement inasmuch as it ordinarily is the most economical in operation. The present invention, however, is not limited to such an arrangement as, if desired, it may operate exclusively with outside or fresh air or with a mixture of fresh and recirculated air in any desired proportion.

Having thus described the invention, what is claimed is:—

1. Air conditioning apparatus comprising a duct adapted to contain a body of adsorbent material, heat exchange apparatus connected to said duct and having tubes with extended surfaces, means for passing either heating or cooling fluid through the tubes, means for flowing water for humidification over the extended surfaces, and means for causing the air to flow over said adsorbent material and through the heat exchanger.

2. Air conditioning apparatus comprising a duct adapted to contain a body of adsorbent material, heat exchange apparatus connected to said duct and having tubes with extended surfaces, a heating fluid supply for the tubes, a common water supply for both the interior and the exterior of the tubes, controlling devices for independently controlling the supply of water to the interior and to the exterior of the tubes, and means for causing the air to flow over said adsorbent material and through the heat exchanger.

3. Air conditioning apparatus comprising a main duct, a by-pass duct, a body of adsorbent material in the by-pass duct, heat exchange apparatus connected to the main duct for either heating or cooling the air passing through the main and by-pass ducts, said apparatus including tubes having extended surfaces, means for supplying either heating fluid or cooling water internally of the tubes, and means for flowing water over the extended surfaces for humidification.

4. Air conditioning apparatus comprising a main duct, a by-pass duct, a body of adsorbent material in the by-pass duct, means for selectively passing air through the main and the by-pass ducts, a heat exchanger and humidifier connected to the main duct and through which air from the main and the by-pass ducts passes, the heat exchanger and humidifier having a common series of tubes for selectively imparting heat to, or removing heat from, the passing air, and connections for supplying heating and cooling medium to the interior of the common series of tubes and humidifying liquid exteriorly thereof.

HENRY R. SEWELL.